April 26, 1966  H. O. DICKSON  3,248,050
COLOR FILTER READ-OUT DEVICE
Filed Jan. 22, 1965
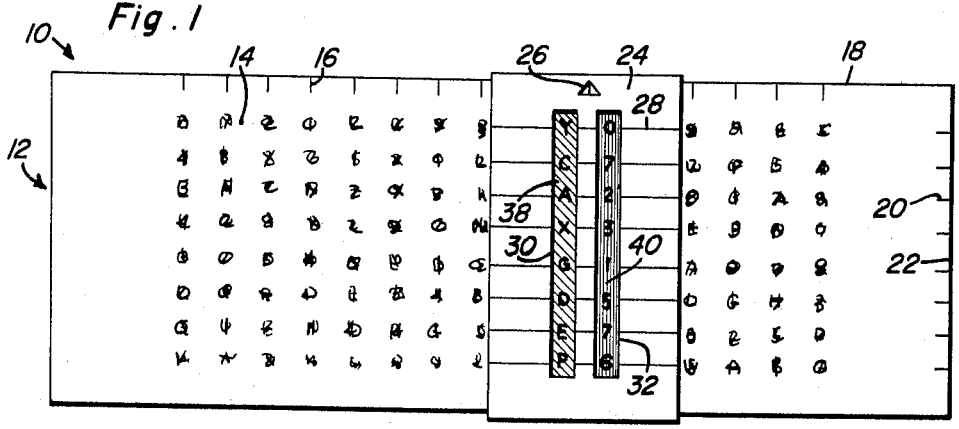
Fig. 1
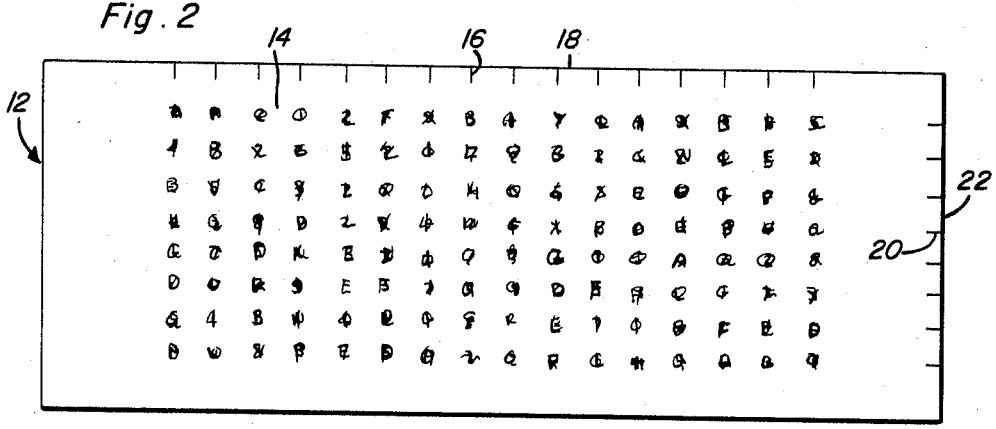
Fig. 2
Fig. 3    Fig. 4    Fig. 5    Fig. 6
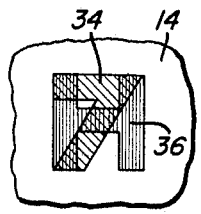
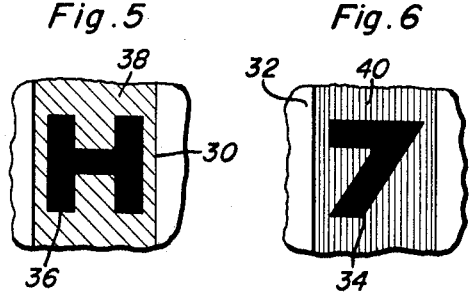
Hubert O. Dickson
INVENTOR.
BY *Thomas A. O'Brien*
*and Harvey B. Jackson*
Attorneys 3,248,050
COLOR FILTER READ-OUT DEVICE
Hubert O. Dickson, P.O. Box 3263, Lubbock, Tex.
Filed Jan. 22, 1965, Ser. No. 427,347
7 Claims. (Cl. 235—89)

This invention relates to a data read-out device employing the color separation principle.

A primary object of the present invention is to provide a new and useful device through which information may be stored and read-out in a simple but convenient manner. Accordingly, the device may be utilized for performing mathematical computations and/or tabulating information.

An additional object of the present invention is to provide a slide rule type of data reading or computing device employing the color separation principle to select information recorded on a calibrated surface.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a top plan view of the data reading device of the present invention.

FIGURE 2 is a top plan view of the base member of the device.

FIGURE 3 is an end view of the device illustrated in FIGURE 1.

FIGURE 4 is an enlarged portion of the calibrated surface of the data reading device.

FIGURE 5 is an enlarged partial view of the portion of the calibrated surface shown in FIGURE 4 as viewed through one of the color filters associated with the data reading device.

FIGURE 6 is an enlarged partial view of the same portion of the calibrated surface as viewed through another color filter associated with the data reading device.

Referring now to FIGURES 1 through 3, is will be observed that the device of the present invention is generally referred to by reference numeral 10 and includes a base member or panel generally referred to by reference numeral 12. The base member may be made of any suitable rigid or semi-rigid material which is relatively thin. In the illustrated embodiment, the base member 12 is rectangular in configuration enclosing on one side thereof, a calibrated surface 14. The surface is calibrated for example by the provision of a position indicating index scale 16 along one edge 18 of the base member and a second index scale 20 along an intersecting edge 22 of the base member. For reasons to be hereinafter explained, the calibrated surface 14 forms a neutral tinted background for indicia printed in chart form on spaced portions of the base member.

The indicia printed or recorded on the base member constitutes the data to be read-out when located by use of the index scales 16 and 20. The data is therefore selected by slidable movement of a slide member 24 over the base member, the slide member being provided with an indicator cut-out for example whereby its relative location may be identified by the scale 16 adjacent the edge 18, calibrated lines 28 also being provided on the slide member for alignment with the scale markings 20 adjacent the edge 22. The slide member is provided with a pair of elongated windows 30 and 32 through which the indicia on the base member surface 14 is exposed. It will therefore be observed, that for any operative position of the slide member 24 relative to the panel 12, two columns of data will be exposed through the windows 30 and 32.

The indicia recorded on the calibrated surface 14 and the data it represents, is formed by overlapping areas of different colors such as an area 34 of an orange-red shade as shown in FIGURE 4 and an area 36 of a blue-green shade. Thus, each column of data exposed through the windows 30 and 32 on the slide member will be formed by over-printed information of different colors. However, the windows mount transparent color filters by means of which transmission of light of a wave length corresponding to the colors of the respective areas 34 and 36, is prevented to thereby limit viewing to one of the colored areas through the respective windows. For example, the color filter 38 mounted in the window 30 will be of an orange-red shade so that only the colored area 36 may be viewed therethrough as shown in FIGURE 5. A color filter 40 of a blue-green shade will be mounted in the window 32 so that only the area 34 may be viewed therethrough as shown in FIGURE 6.

From the foregoing description, the construction, operation and utility of the present invention will be apparent. It will therefore be appreciated, that the base member 12 will be made of a suitable dimension and the overprinted data columns so spaced for exposure through the windows 30 and 32 as to permit reading of two columns simultaneously corresponding to input information reflected by the positioning of the slide member in alignment with the scale markings 16. Alternatively, different information recorded in each column or space may be read-out by exposure through different windows 30 and 32. Thus, the device may be utilized to perform various mathematical functions as well as to read-out selected information in general which has been stored on the base member by recording of the indicia thereon. The neutral tint of the calibrated surface 14 is selected so as to eliminate ghost images of the colored areas when viewed through the filters.

It will be perceived also, that doubling up of information in the tabular columns, and the reading thereof through discriminating filters, in effect extends the capacity of the slide rule; i.e. for each one column displacement of slider 24 two adjoining columns of distinctive non-recurring data may be read.

It should also be appreciated, that in accordance with the present invention, more than two different colored areas could be utilized as well as a plurality of windows and different colored filters. Also, optical facilities equivalent to the color filters could be utilized such as the use of colored sources of light to which the read-out device may be exposed.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A data reading device comprising, a base member having intersecting edges, first indicia means mounted on said base member forming a plurality of spaced areas thereon of a first color, second indicia means mounted on said base member forming spaced areas thereon of a second color overlapping said respective areas of the first color, index means mounted along said intersecting edges on the base member of simultaneously locating said spaced areas of the first and second indicia means, a slide member movably mounted on the base member and having at least two windows, indicator means mounted on the slide member and cooperating with the index means for positioning the slide member with said spaced areas of the indicia means respectively exposed through the windows and optical means for preventing transmission of light of said first color through one of the windows, and said second color through the other of the windows.

2. The combination of claim 1 wherein said optical means comprises transparent color filters mounted in said windows.

3. The combination of claim 2 wherein said base member is provided with a neutral color background on which the indicia means forms said spaced areas of said first and second colors.

4. The combination of claim 1 wherein said base member is provided with a neutral color background on which the indicia means forms said spaced areas of said first and second colors.

5. A data read-out device comprising, a base member having a calibrated surface on which data is recorded, said data being in the form of spaced portions having overlapping areas of different colors, data locating means movably mounted on the base member for selecting the spaced portions of the base member, said data locating means having a plurality of windows through which said selected portions are exposed, and color filter means mounted in said windows for preventing transmission of light through said windows at different wave lengths corrseponding to said different colors to form images from only one of the overlapping areas in one of the windows and images from only the other of the overlapping areas in the other of the windows.

6. In a computing device having a slide member and a panel member and at least two windows formed in one of said members for exposing a plurality of spaced portions on the other of said members, position indicating means mounted on said members for identifying the relative positions of said members, indicia mounted on the respective portions of said other of the members including overlapping areas of different colors, and color filter means mounted in said windows for viewing a different one of said overlapping areas of the spaced portions when exposed through each of said windows to register data corresponding to the relative positions identified by the position indicating means.

7. A slide computer comprising a rectangular panel having intersecting edges along which index scales are formed, a slide mounted on the panel for movement parallel to one of said edges, a plurality of parallel spaced columns of data printed on said panel along rows parallel to said one of the edges, the data printed at the intersections of each of said columns and rows being formed by overlapping portions of different colors, a pair of spaced windows in the slide elongated in a direction parallel to said columns of data, indicator means on the slide cooperating with said index scales to register the positons on the panel at which two of said columns of data are simultaneously exposed through the windows, and color filter means mounted in said windows for viewing a different one of the overlapping portions of the data in each of said columns when exposed through each of said windows.

References Cited by the Examiner
UNITED STATES PATENTS

| | | | |
|---|---|---|---|
| 174,206 | 2/1876 | David | 88—29 |
| 1,032,024 | 7/1912 | Rawlings | 88—29 |
| 1,285,753 | 11/1918 | Lowenstein | 88—29 |
| 1,422,527 | 7/1922 | Berger | 88—29 |
| 2,531,633 | 11/1950 | Laurin | 235—89 |
| 2,542,834 | 2/1951 | Peurozet | 235—89 |
| 3,045,908 | 7/1962 | Donovan | 235—89 |
| 3,125,290 | 3/1964 | Smith | 235—89 |

LEO SMILOW, *Primary Examiner.*

C. G. COVELL, *Assistant Examiner.*